United States Patent [19]

Matrick

[11] Patent Number: 5,224,987
[45] Date of Patent: Jul. 6, 1993

[54] PENETRANTS FOR AQUEOUS INK JET INKS

[75] Inventor: Howard Matrick, Highlands, N.J.

[73] Assignee: E. I. du Pont de Nemours and Company, Wilmington, Del.

[21] Appl. No.: 790,944

[22] Filed: Nov. 12, 1991

[51] Int. Cl.$^5$ ............................................. C09D 11/02
[52] U.S. Cl. ................... 106/20 R; 106/22 R
[58] Field of Search ............... 106/20, 22, 20 R, 22 R

[56] References Cited

U.S. PATENT DOCUMENTS

| | | | |
|---|---|---|---|
| 3,889,269 | 6/1975 | Meyer et al. | 346/1 |
| 4,325,735 | 4/1982 | Ohta et al. | 106/22 |
| 4,400,215 | 8/1983 | Cooke et al. | 106/22 |
| 4,425,162 | 1/1984 | Sugiyama et al. | 106/22 |
| 4,713,113 | 12/1987 | Shimada et al. | 106/22 |
| 4,963,189 | 10/1990 | Hindagolia | 106/22 |
| 4,971,628 | 11/1990 | Loftin | 106/22 |
| 5,053,078 | 10/1991 | Koike et al. | 106/20 |
| 5,085,698 | 2/1992 | Ma et al. | 106/20 |
| 5,122,187 | 6/1992 | Schwarz et al. | 106/25 |

FOREIGN PATENT DOCUMENTS 008031 1/1976 Japan.
1-03274 4/1990 Japan.

Primary Examiner—Mark L. Bell
Assistant Examiner—Helene Klemanski

[57] ABSTRACT

Ink compositions for ink jet printers comprise an aqueous carrier medium, pigment dispersion or dye and a selected amide or lactam penetrant having a solubility in water of at least 4.5% at 25° C. and 5-10 carbon atoms exhibit rapid drying, excellent storage stability and have excellent crusting properties.

27 Claims, No Drawings

PENETRANTS FOR AQUEOUS INK JET INKS

FIELD OF THE INVENTION

This invention relates to aqueous inks for ink jet printers. More particularly, this invention relates to aqueous ink jet inks comprising selected carboxylic acid amide cosolvents that impart rapid media penetration and improved ink stability.

BACKGROUND OF THE INVENTION

Ink jet printing is a non-impact printing process in which a digital signal produces droplets of ink on media substrates such as paper or transparent films. It is widely used in industrial and office applications. Thermal or bubble jet drop-on-demand ink jet printers are the generally accepted medium price printers for personal computers. These printers have been widely received due to their high print quality, low cost, relatively quiet operation, environmental safety and graphics capability.

Both dyes and pigments have been used as colorants for ink jet printer inks. Dye colorants are generally disfavored because they are water-soluble even after drying, whereby they can be redissolved by contact with water and will run or smear when exposed to a water spill, or upon contact with felt pen markers and sweaty hands. In addition, they exhibit poor light stability and are known to fade even under conditions of office fluorescent lighting. These disadvantages of dye colorant ink jet inks prohibit their use in applications requiring water resistance and light stability.

Pigments are a preferred colorant in water-based ink jet inks because pigments are substantially water-insoluble and inherently more lightfast than dyes, thus providing improved water and smear resistance and improved lightfastness.

One of the major commercial objections to thermal ink jet printers is their relatively slow printing speed compared to printers using competing technologies, largely due to the rate of drying of the ink jet inks. In a sheet fed printer, the ink must be dry before the succeeding sheet contacts it or the ink will smear.

Drying time can be lessened by including a cosolvent that is miscible with water and has a higher vapor pressure thereby accelerating drying by evaporation. This approach is disadvantageous because the solvent also evaporates more rapidly in the pen opening, which tends to result in obstruction or blockage of the openings (known as "crusting") in the pen nozzles after a period of non-use.

A preferred approach to improve the rate of drying is to use a cosolvent that causes rapid drying by increasing the rate of penetration of the ink into the media substrate. Such cosolvents, referred to hereafter as penetrants, although preferred, are not without their disadvantages. A particular problem with known penetrants is that they are not suitable for use with pigmented inks because they cause the pigment dispersions to flocculate and settle. In addition, the more commonly used penetrants have shown an incompatibility with the materials of construction of the pen body, in particular the swelling of organic polymeric materials.

Thus, there is a need for penetrants which decrease drying time, have improved crusting properties, which minimize the risk of material incompatibility and which are particularly suitable for use with the more preferred pigmented ink compositions.

SUMMARY OF THE INVENTION

The penetrants of this invention have the ability to impart rapid drying by media penetration without inducing pigment dispersion flocculation or settling. These penetrants are also useful in dye colorant ink compositions.

In accordance with this invention, there is provided an aqueous ink jet ink composition comprising:
(a) an aqueous carrier medium, present in a major amount;
(b) a colorant; and
(c) a penetrant having a solubility in water of at least 4.5% at 25° C., and which is selected from the group consisting of:
1) unsubstituted or acyclic alkyl substituted amides having the general structure:

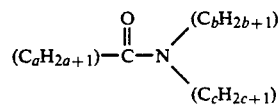

wherein $a+b+c=4-9$, preferably 4-8, and most preferably 4-7 and a, b and c are zero or a whole integer;

2) Unsubstituted and N-alkyl lactams having the general structure:

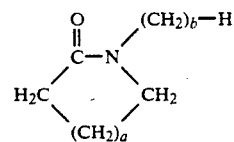

wherein $a+b=4-6$, preferably 4-5, b is 0 or a whole integer, and a is a whole integer; and 3) Amides substituted by one cycloalkyl group having the general structure:

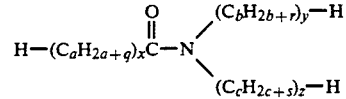

wherein x, y or $z=0$ or 1, q, r or $s=-1$ or 1; and $a+b+c=5-9$, preferably 6-9, and most preferably 6-7.

The inks of the invention have excellent stability, low viscosity, provide excellent smear resistance after drying and good crusting time. They may be used with a variety of ink jet printers such as continuous, piezoelectric, drop-on-demand and thermal or bubble jet drop-on-demand, and are particularly adapted for use in thermal ink jet printers.

DESCRIPTION OF THE INVENTION

The invention relates to an ink jet ink composition which is particularly suited for use in ink jet printers in general, and thermal ink jet printers in particular. The ink jet ink composition encompasses both pigment and dye colorant inks.

The inks may be adapted to the requirements of a particular ink jet printer to provide a balance of light stability, smear resistance, viscosity, surface tension, optical density, and crust resistance. The penetrants of this invention are stable to oxygen and are especially resistant to hydrolysis in aqueous inks when formulated near a neutral pH.

AQUEOUS CARRIER MEDIUM

The aqueous carrier medium is water or a mixture of water and at least one water soluble organic solvent other than the selected amide penetrant. Deionized water is commonly used.

Selection of a suitable mixture of water and water soluble organic solvent depends upon requirements of the specific application, such as desired surface tension and viscosity, the selected pigment, drying time of the pigmented ink jet ink, and the type of media substrate onto which the ink will be printed.

Water-soluble organic solvents are well known, examples of which include: (1) alcohols, such as methyl alcohol, butyl alcohols, furfuryl alcohols, etc.; (2) ketones or ketoalcohols such as acetone, methyl ethyl ketone, diacetone alcohol, etc.; (3) ethers, such as tetrahydrofuran, dioxane, etc.; (4) esters, such as ethyl acetate, ethyl lactate, ethylene carbonate, propylene carbonate, etc.; (5) polyhydric alcohols, such as ethylene glycol, propylene glycol, polyethylene glycol, 2-methyl-2,4-pentanediol, 1,2,6-hexanetriol, thiodiglycol, etc.; (6) lower alkyl mono- or di-ethers derived from alkylene glycols, such as ethylene glycol (mono/di)-(methyl-/ethyl ether), propylene glycol (mono/di)-(methyl-/ethyl) ether, triethylene glycol (mono/di)-(methyl-/ethyl) ether, etc.; (7) nitrogen containing cyclic compounds, such as pyrrolidone, N-methyl-2-pyrrolidone, 1,3-dimethyl-2-imidazolidinone, etc.; and (8) sulfur containing compounds such as dimethyl sulfoxide, dimethyl sulfone, tetramethylene sulfoxide, etc.

A mixture of a water soluble organic solvent having at least 2 hydroxyl groups e.g, diethylene glycol, and deionized water is preferred as the aqueous carrier medium. In the event that a mixture of water and organic solvent is used as the aqueous carrier medium, water would comprise between 30% and 95%, preferably 60% to 95%, by weight of the aqueous medium, based on the total weight of the aqueous carrier medium plus amide penetrant.

COLORANTS

The colorants useful in the present invention may be a pigment dispersion or a dye. The term "pigment dispersion", as is known in the art and as used herein, refers to a mixture of a pigment and a dispersing agent. Preferably, the dispersing agent is a polymeric dispersant compound.

Dyes which are commonly used in aqueous ink jet inks, such as for example Acid, Direct, Food and Reactive dyes, are suitable colorants for the ink compositions of the present invention.

In the preferred embodiment of the present invention, the colorant is a pigment dispersion. In addition to, or in place of the preferred polymeric dispersant compounds, surfactant compounds may be used as dispersants. These may be anionic, cationic, nonionic, or amphoteric surfactants. A detailed list of non-polymeric as well as some polymeric dispersants are listed in the section on dispersants, pages 110–129, 1990 McCutcheon's Functional Materials, North American Edition, Manufacturing Confection Publishing Co., Glen Rock, N.J., 07452, the disclosure of which is incorporated herein by reference.

Polymeric dispersants suitable for practicing the invention include AB or BAB block copolymers, wherein the A segment is a hydrophobic (i.e., water insoluble) homopolymer or copolymer which serves to link with the pigment and the B block is a hydrophilic (i.e., water soluble) homopolymer or copolymer, or salts thereof, and serves to disperse the pigment in the aqueous medium. Such polymeric dispersants and the synthesis thereof are disclosed in Ma et al., U.S. Ser. No. 07/508,145, filed Apr. 11, 1990 now U.S. Pat. No. 5,085,698 the disclosure of which is incorporated herein by reference.

Preferred AB block polymers are: methyl methacrylate(10 monomer units)/copolymer of methyl methacrylate(5 monomer units) and methacrylic acid(7.5 monomer units); 2-ethylhexyl methacrylate(5)-/copolymer of 2-ethylhexyl methacrylate(5) and methacrylic acid(10); n-butyl methacrylate(10)/copolymer of n-butyl methacrylate(5) and methacrylic acid(10); n-butyl methacrylate(10)/methacrylic acid(10); ethylhexyl methacrylate(5)/copolymer of methyl methacrylate(10) and methacrylic acid(10); n-butyl methacrylate(5)/copolymer of 2-hydroxyethyl methacrylate(10) and methacrylic acid(10); n-butyl methacrylate(15)/copolymer of 2-hydroxyethyl methacrylate(7.5) and methacrylic acid(3); methyl methacrylate(5)/copolymer of ethylhexyl methacrylate(5) and methacrylic acid(10); and butyl methacrylate(5)-/copolymer of butyl methacrylate(5) and dimethylaminoethyl methacrylate(10).

Preferred BAB block polymers are: copolymer of n-butyl methacrylate(5) and methacrylic acid(10)/n-butyl methacrylate(10)/copolymer of n-butyl methacrylate(5) and methacrylic acid(10); copolymer of methyl methacrylate(5) and methacrylic acid(7.5)-/methyl methacrylate(10)/copolymer of methyl methacrylate(5) and methacrylic acid(7.5).

To solubilize the B block into the aqueous medium it may be necessary to neutralize the acid or amino groups contained in the B block. Neutralizing agents include organic bases; alcohol amines; pyridine; ammonium hydroxide; tetraalkylammonium salts; alkali metals such as lithium, sodium and potassium, and the like. Preferred neutralizing agents include dimethylethanolamine and sodium and potassium hydroxides, with potassium hydroxide being particularly preferred for inks to be used in thermal ink jet printers.

Although random copolymers can be used as dispersing agents, they are not as effective in stabilizing pigment dispersions as the block polymers, and therefore are not preferred.

Useful pigments for the dispersion comprise a wide variety of organic and inorganic pigments, alone or in combination. The term "pigment" as used herein means an insoluble colorant. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 micron. Preferably, the pigment particle size should range from 0.005 to 5 micron and most preferably, from 0.01 to 0.3 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used in practicing the invention are disclosed in the aforementioned U.S. Ser. No. 07/508,145, which is incorporated herein by reference.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

AMIDE COSOLVENTS

The amide penetrants of the present invention have a solubility in water of at least 4.5% (4.5 parts penetrant in 100 parts of water) at 25° C. and are represented by the following groups:

1) Unsubstituted and acyclic alkyl substituted amides having the general structure:

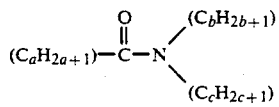

wherein $a+b+c=4-9$, preferably 4–8, and most preferably 4–7 and a, b and c are 0 or a whole integer;

All possible position isomers may be useful. For example, N-butylpentanamide, where $a+b+c=8$, represents a structure with 16 different position isomers. Similarly, N-hexylacetamide has 13 different position isomers. Within this structural type where $a+b+c=4-9$, there exists about 1000 potentially useful compounds not including geometric or optical isomers. These compounds are useful provided their solubility in water is at least 4.5% at 25° C.

Examples of amides fitting this formula include: n-pentanamide, N-methylbutanamide, N-methyl-2-methylpropanamide, N,N-dimethylpropanamide, N-ethylpropanamide, N,N-diethylformamide, N-n-butylformamide, N-isobutylformamide, N-sec-butylformamide, N-tert-butylformamide, n-hexanamide, N-methyl-n-pentanamide, N-methyl-2-methyl-n-butanamide, N,N-dimethyl-n-butanamide, N,N-dimethyl-2-methylpropanamide, N-ethyl-n-butanamide, N-ethyl-2-methylpropanamide, N,N-diethylacetamide, N-n-propylpropanamide, N-n-butylacetamide, N-isobutylacetamide, N-sec-butylacetamide, N-tert-butylacetamide, N-methyl-n-hexanamide, N,N-dimethyl-n-pentanamide, N,N-dimethyl-2-methyl-n-butanamide, N-ethyl-n-pentanamide, N-ethyl-2-methyl-n-butanamide, N,N-diethylpropanamide, N-n-propyl-n-butanamide, N-n-propyl-2-methyl-propanamide, N,N-di-n-propylacetamide, N-isopropyl-n-butanamide, N-isopropyl-2-methylpropanamide, N,N-diisopropylacetamide, N-n-butylpropanamide, N-isobutylpropanamide, N-sec-butylpropanamide, N-tert-butylpropanamide, N-methyl-n-octanamide, N,N-dimethyl-n-heptanamide, N-ethyl-n-heptanamide, N,N-diethyl-n-pentanamide, N,N-diethyl-2-methyl-n-butanamide, N-n-propyl-n-hexanamide, N-n-propyl-2-methyl-n-pentanamide, N,N-di-n-propylpropanamide, N-isopropyl-n-hexanamide, N-isopropyl-2-methyl-n-pentanamide, N,N-diisopropylpropanamide, N-n-butyl-n-pentanamide, N-n-butyl-2-methyl-n-butanamide, N,N-di-n-butylformamide, N-isobutyl-n-pentanamide, N-isobutyl-2-methyl-n-butanamide, N,N-diisobutylformamide, N-sec-butyl-n-pentanamide, N-sec-butyl2-methyl-n-butanamide, N,N-di-sec-butylformamide, N-tert-butyl-n-pentanamide, N-tert-butyl-2-methyl-n-butanamide, N,N-di-tert-butylformamide, N,N-dimethyl-n-octanamide, N-ethyl-n-octanamide, N,N-diethyl-n-hexanamide, N,N-diethyl-2-methyl-n-pentanamide, N-propyl-n-heptanamide, N-propyl-2-methyl-n-hexanamide, N,N-di-n-propyl-n-butanamide, N,N-di-n-propyl-2-methyl-propanamide, N-isopropyl-n-heptanamide, N-isopropyl-2-methyl-n-hexanamide, N,N-diisopropyl-n-butanamide, N,N-diisopropyl-2-methyl-propanamide, N-n-butyl-n-hexanamide, N-n-butyl-2-methyl-pentanamide, N,N-di-n-butylacetamide, N-isobutyl-n-hexanamide, N-isobutyl-2-methyl-pentanamide, N,N-diisobutylacetamide, N-sec-butyl-n-hexanamide, N-sec-butyl-2-methyl-pentanamide, N,N-di-sec-butylacetamide, N-tert-butyl-n-hexanamide, N-tert-butyl-2-methyl-pentanamide, N,N-di-tert-butylacetamide and the like.

2) Unsubstituted and N-alkyl lactams having the general structure:

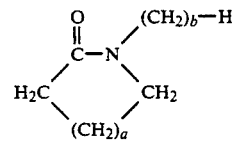

wherein $a+b=4-6$, preferably 4–5, b is 0 or a whole integer, and a is a whole integer.

Some examples of this type are oenthantholactam, N-n-propyl-pyrrolidone, N-isopropyl-pyrrolidone, N-n-butyl-pyrrolidone, N-iso-butyl-pyrrolidone, N-sec-butyl-pyrrolidone, N-tert-butyl-pyrrolidone, N-ethyl-valerolactam, N-n-propyl-valerolactam, N-isopropyl-valerolactam, N-n-butyl-valerolactam, N-iso-butyl-valerolactam, N-sec-butyl-valerolactam, N-tert-butyl-valerolactam, N-ethyl-caprolactam, N-n-propyl-caprolactam, N-isopropyl-caprolactam, N-methyloenthantholactam and the like.

3) Amides substituted by one cycloalkyl group having the general structure:

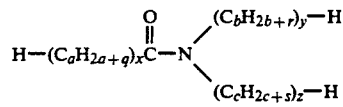

wherein x, y or $z=0$ or 1, q, r or $s=-1$ or 1, and $a+b+c=5-9$, preferably 6–9, and most preferably 6–7.

The groups $(C_aH_{2a+q})_x$—H, $(C_bH_{2b+r})_y$—H and $(C_cH_{2c+s})_z$—H represent independently hydrogen (—H) when x or y or z is 0, acycloalkyl when q or r or s is 1 and x or y or z is 1 and cycloalkyl when q or r or s is -1 and x or y or z is 1.

Some examples of penetrants of this structure, wherein a times x equals 0–4, include N-cyclopentylformamide, N-cyclopentyl-N-methylformamide, N-cyclopentyl-N-ethylformamide, N-cyclopentyl-N-n-propylformamide, N-cyclopentyl-N-isopropylformamide, N-cyclopentyl-N-n-butylformamide, N-cyclopentyl-N-isobutylformamide, N-cyclopentyl-N-sec-butylformamide, N-cyclopentyl-N-tert-butylformamide, N-cyclopentylacetamide, N-cyclopentyl-N-methylacetamide, N-cyclopentyl-N-ethylacetamide, N-cyclopentyl-N-n-propylacetamide, N-cyclopentyl-N-isopropylacetamide, N-cyclohexylformamide, N-cyclohexyl-N-methylformamide, N-cyclohexyl-N-ethylformamide, N-cyclohexyl-N-n-propylformamide, N-cyclohexyl-N-isopropylformamide, N-cyclohexylacetamide, N-cyclohexyl-N-methylacetamide, N-cyclohexyl-N-ethylacetamide, N-cycloheptylformamide, N-cycloheptyl-N-methylformamide, N-cycloheptyl-N-ethylformamide, N-cycloheptylacetamide, and N-cycloheptyl-N-methylacetamide.

Cycloalkyl rings may have ring hydrogens substituted by methyl or ethyl groups to make useful penetrants if the total number of carbon atoms and the water solubility meet the necessary specifications.

The amides of the invention having the recited number of carbon atoms are generally excellent penetrants. However, there may be a few compounds that fit these structures, but which because of the presence of impurities are marginal as penetrants. Amides having a lower number of carbon atoms, such as formamide, N-methylformamide, N,N-dimethylformamide, acetamide, N-methylacetamide N,N-dimethylformamide, acetamide, N-methylacetamide, and N,N-dimethylacetamide (which are known cosolvents for aqueous ink jet inks) are not effective penetrants. In addition, most of these compounds pose serious toxicological problems. Acetamide, for example, is a carcinogen and many of the others are developmental or reproductive toxins. Amides having a greater number of carbon atoms are water insoluble and make poor penetrants. Moreover, many of these amides are incompatible with the pigment dispersions and, therefore, are not suitable for use in pigmented ink compositions.

The amides of this invention, however, give good dispersion stability and have fast drying times of 15 seconds or less. The penetrants with drying times of about 15 seconds are especially useful in minimizing feathering and maximizing image acuity and resolution.

As little as 1% penetrant, based on the total weight of the ink, has some effect, but about 3–10% is a preferred range. Higher penetrant concentrations may be used to increase drying rate (up to about 70%), but this increased penetration/drying rate must be balanced against decreased dispersion stability.

Particular amides of this invention may be chosen for specific inks on the basis of a need for certain physical properties such as boiling point or melting point or "friendliness", i.e., printability or freedom from crusting with a specific set of ingredients. Some of the amide penetrants have outstanding resistance to crusting. Mixtures of selected amide penetrants may also be used to optimize and balance various ink properties.

OTHER INGREDIENTS

The ink may contain other ingredients. For example, the surfactants mentioned above may be used to alter surface tension as well as maximize penetration. However, they may also destabilize the pigment dispersion for pigmented inks. The choice of a specific surfactant is also highly dependent on the type of media substrate to be printed. It is expected that one skilled in the art can select the appropriate surfactant for the specific substrate to be used in printing. In aqueous inks, the surfactants may be present in the amount of 0.01–5% and preferably 0.2–2%, based on the total weight of the ink.

Biocides may be used in the ink compositions to inhibit growth of microorganisms. Dowicides® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.) and sodium benzoate are examples of such biocides.

In addition, sequestering agents such as EDTA may also be included to eliminate deleterious effects of heavy metal impurities.

Other known additives, such as humectants, viscosity modifiers and other acrylic or non-acrylic polymers made also be added to improve various properties of the ink compositions.

INK PREPARATION

The ink compositions of the present invention are prepared in the same manner as other ink jet ink compositions. If a pigment dispersion is used as the colorant, the dispersion is prepared by premixing the selected pigment(s) and dispersant in water. The dispersion step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium. Amide compounds as well as other cosolvents may be present during the dispersion step.

If a dye is used as the colorant, there is no dispersant present and no need for pigment deaggregation. The dye-based ink is prepared in a well agitated vessel rather than in dispersing equipment.

It is generally desirable to make the pigmented ink jet ink in concentrated form, which is subsequently diluted with a suitable liquid to the appropriate concentration for use in the ink jet printing system. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments.

The acrylic block polymer is present in the range of approximately 0.1 to 30% by weight of the total ink composition, preferably in the range of approximately 0.1% to 8% by weight of the total ink composition. If the amount of polymer becomes too high, the ink color density will be unacceptable and it will become difficult to maintain desired ink viscosity. Dispersion stability of the pigment particles is adversely affected if insufficient acrylic block copolymer is present.

The amount of aqueous carrier medium plus penetrant is in the range of approximately 70 to 99.8%, preferably approximately 94 to 99.8%, based on total weight of the ink when an organic pigment is selected, approximately to 99.8%, preferably approximately 70 to 99.8% when an inorganic pigment is selected and 80 to 99.8% when a dye is selected. Up to 20% of dye may be present, based on the total weight of the dye-based ink.

Jet velocity, separation length of the droplets, drop size, and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm at 20° C. Acceptable viscosities are no greater than 20 cP, and preferably in the range of about 1.0 cP to about 10.0 cP at 20° C. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus. Fixing the ink on the media substrate, such as, paper, fabric, film, etc., can be carried out rapidly and accurately.

The printed ink images have clear color tones, high density, excellent water resistance and lightfastness. Furthermore, the ink does not corrode parts of the ink jet printing device it comes in contact with, and it is essentially odorless.

EXAMPLES

A pigmented ink composition was prepared and used with the amide penetrants of the invention and other known cosolvents for comparison as follows:

Dispersant Preparation

A block copolymer of n-butyl methacrylate and methacrylic acid was prepared by adding 3750 grams of tetrahydrofuran and 7.4 grams of p-xylene to a 12-liter flask equipped with a mechanical stirrer, thermometer, nitrogen inlet, drying tube outlet, and addition funnels. A tetrabutyl ammonium m-chlorobenzoate catalyst (3.0 ml of a 1.0M solution in acetonitrile), were then added to the flask and 291.1 grams (1.25 M) of an initiator, 1,1-bis(trimethyl-siloxy)-2-methyl propene, were injected. Feed I (which consisted of the tetrabutyl ammonium m-chlorobenzoate catalyst), was started at 0 minutes and added over 150 minutes. Feed II which consisted of 1976 gm (12.5M) trimethylsilyl methacrylate, was started at 0 minutes and added over 35 minutes. One hundred eighty minutes after Feed II was completed (over 99% of the monomers had reacted), Feed III, which consisted of 1772 gm (12.5M) butyl methacrylate, was started and added over 30 minutes.

At 400 minutes, 780 grams of dry methanol were added to the above solution and distillation commenced. During the first stage of distillation, 1300.0 grams of material with a boiling point below 55° C. were removed from the flask. The theoretical amount of methoxytrimethylsilane, having a boiling point of 54° C., to be removed was 1144.0 grams. Distillation continued during the second stage while the boiling point increased to 76° C. 5100 gms of isopropanol were added during the second stage of distillation. A total of 7427 grams of solvent were removed.

The resultant resin solution contained 55.8% solids and had a neutralization equivalent of 4.65 milliequivalents of potassium hydroxide per gram of solids. The resin was neutralized by adding to a 1000 ml cylindrical polyethylene bottle:
200.0 grams dispersant solution
174.4 grams 15% potassium hydroxide
137.6 grams deionized water
The mixture was tumbled on a roller mill for 3–4 hours and then magnetically stirred for 16–20 hours to give a slightly cloudy solution.

Preparation of Pigment Dispersion

The following materials were added to a 1 liter beaker:
78.3 grams deionized water
66.7 grams neutralized dispersant solution
3.0 grams 15% potassium hydroxide
The solution was mechanically stirred while 20.0 grams of carbon black pigment, FW 18 (Degussa Corp., Ridgefield Park, N.J. 07660) were added slowly while stirring was continued for 30 minutes. The mixture was then added to a Mini Motormill 100 (Eiger Machinery Inc., Bensenville, Ill.) with another 32 grams of deionized water as a rinse. The contents were milled at 3500 rpm for one hour. The yield was 190.8 grams. The pH was 7.6. The particle size was 138 nm as determined by a Brookhaven BI-90 Particle analyser (Brookhaven Instruments Corp., Holtsville, N.Y.).

Preparation of Inks

Using the pigment dispersion from the above procedures, a series of aqueous inks were prepared by combining 2.6 grams diethylene glycol (Aldrich Chemical Co. Inc., Milwaukee, Wis.), 0.5 grams Silwet ® L-77 (Union Carbide Corp., Danbury, Conn.), 37.2 grams deionized water and 2.6 grams of comparative cosolvent of penetrant from Table 1 and that mixtures to 22.5 grams of pigment dispersion with magnetic stirring over a period of 10–15 minutes.

TABLE 1

| Cosolvents And Amide Penetrants | | |
|---|---|---|
| | Source | |
| Comparative Cosolvents | | Control # |
| N-Methylformamide | E | 1 |
| N,N-Dimethylformamide | E | 2 |
| N-Ethylformamide | E | 3 |
| Formamide | E | 4 |
| Acetamide | E | 5 |
| N,N-Di-n-butylformamide | E | 6 |
| N,N-Bis(2-hydroxyethyl)formamide | A | 7 |
| Butyl Carbitol ® | I | 8 |
| Dowanol ® TBH | C | 9 |
| n-Benzylformamide | A | 10 |
| N-Ethylacetamide | E | 11 |
| 4-Acetylmorpholine | A | 12 |
| N-Methylpropanamide | E | 13 |
| 2-Pyrrolidone | A | 14 |
| N-Methyl-2-pyrrolidone | A | 15 |
| Penetrants | | Example # |
| N,N-Diisopropylformamide | A | 1 |
| N-Cyclohexylformamide | A | 2 |
| Pentanamide | G | 3 |
| N-sec-Butylbutanamide | B | 4 |
| N,N-Diethylpropanamide | B | 5 |
| N,N-Diethylbutanamide | E | 6 |
| N-Isobutylformamide | B | 7 |
| N-sec-Butylformamide | B | 8 |
| N-n-Butylformamide | G | 9 |

TABLE 1-continued

| Cosolvents And Amide Penetrants | | |
|---|---|---|
|  | Source |  |
| N-tert-Butylformamide | A | 10 |
| N-n-Butylacetamide | D | 11 |
| N-Isobutylpropanamide | B | 12 |
| N-sec-Butylpropanamide | B | 13 |
| N-n-Butylpropanamide | H | 14 |
| N,N-Dipropylformamide | F | 15 |
| Oenthalolactam | D | 16 |
| N-n-Butyl-2-pyrrolidone | E | 17 |

A. Aldrich Chemical Co., Milwaukee WI 53233
B. Dixon Chemicals, Sherwood Park,Alberta T8C 1G9 Canada
C. Dow Chemical Co., Midland, MI 48640
D. Fisher Scientific Co., Pittsburgh, PA 15219
E. Fluke Chemie AG, Ronkonkoma, NY 11779
F. Frinton Laboratories, Inc., Vineland, NJ 08360
G. Pfaltz & Bauer, Inc., Waterbury, CT 06708
H. TCI America, Portland, OR 97203
I. Union Carbide Corp., Danbury CT 06817

Drying times were obtained by printing rapidly a series of solid patterns with a Hewlett Packard DeskJet printer (Hewlett Packard Co., Palo Alto, Calif.) using a semiabsorbent paper, Gilbert Bond (Mead Co., Dayton, Ohio). The printed patterns were then wiped in 15 second increments and the drying time was recorded as the time at which the printed ink would no longer smear. Ink compositions with a rating of ca. 15 seconds gave only trace smears at the 15 second interval and no visible smear at 30 seconds, indicating that they were substantially dry at 15 seconds.

TABLE 2

| Sample No. | Drying Times | |
|---|---|---|
| | Dry Time, seconds | |
| | controls | examples |
| 1 | 30–45 | ca. 15 |
| 2 | 30–45 | 0–15 |
| 3 | 30–45 | ca. 15 |
| 4 | 15–30 | 0–15 |
| 5 | Carcinogen* | ca. 15 |
| 6 | Insoluble* | 0–15 |
| 7 | 30–45 | 0–15 |
| 8 | 0–15 | ca. 15 |
| 9 | 0–15 | 0–15 |
| 10 | Insoluble* | ca. 15 |
| 11 | 30–45 | 0–15 |
| 12 | 30–45 | 0–15 |
| 13 | 30–45 | 0–15 |
| 14 | 30–45 | 0–15 |
| 15 | 15–30 | 0–15 |
| 16 | — | ca. 15 |
| 17 | — | 0–15 |

Samples marked by an asterisk (*) were not formulated into ink compositions.

Dispersion stability was obtained by subjecting 15 grams of ink to four temperature cycles, each consisting of 4 hours at −20° C. and 4 hours at 60° C. Particle sizes were measured on a Brookhaven BI-90 (Brookhaven Instruments Corp., Holtsville, N.Y.) before and after cycling. Particle size changes of 0–5 nm were considered excellent, 5–10 good, 10–19 fair and 20 or greater poor.

TABLE 3

| Sample No. | Dispersion Stability | |
|---|---|---|
| | Change in particle size (nanometers) | |
| | controls | examples |
| 1 | −2 | 13 |
| 2 | 4 | 9 |
| 3 | 1 | 0 |
| 4 | 4 | 9 |
| 5 | Carcinogen* | 6 |
| 6 | Insoluble* | 9 |
| 7 | 25 | 5 |
| 8 | 36 | 5 |
| 9 | 22 | 5 |
| 10 | Insoluble* | 5 |
| 11 | −1 | 1 |
| 12 | 33 | 2 |
| 13 | 2 | 2 |
| 14 | 15 | 13 |
| 15 | 1 | 11 |
| 16 | —· | 4 |
| 17 | — | 11 |

Samples marked with an asterisk (*) were not converted into ink compositions.

What is claimed is:

1. An aqueous ink jet ink composition comprising:
   (a) an aqueous carrier medium, present in a major amount;
   (b) a colorant; and
   (c) a penetrant having a solubility in water of at least 4.5% at 25° C., and which is selected from the group consisting of:
   1) Unsubstituted or acyclic alkyl substituted amides having the general structure:

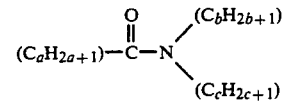

wherein $a+b+c=4-9$, and a, b and c are 0 or a whole integer;
   2) Unsubstituted and N-alkyl lactams having the general structure:

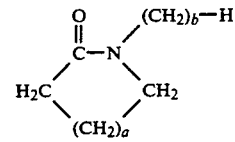

wherein $a+b=4-6$, b is 0 or a whole integer, and a is a whole integer; and
   3) Amides substituted by one cycloalkyl group having the general structure:

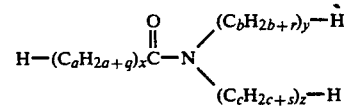

wherein x, y or $z=0$ or 1, q, r or $s=-1$ or 1, and $a+b+c=5-9$.

2. The ink composition of claim 1, wherein said colorant is a pigment dispersion comprising a pigment and a dispersant.

3. The ink composition of claim 2 wherein the dispersant is a polymeric dispersant.

4. The ink composition of claim 1, wherein the penetrant is an amide compound represented by structure and wherein $a+b+c=4-8$.

5. The ink composition of claim 4, wherein a+b+c=4-6.

6. The ink composition of claim 4, wherein a=0-4.

7. The ink composition of claim 4, wherein the amide compound is selected from the group consisting of N,N-di-isopropylformamide, N,N-di-isopropylacetamide, N,N-di-n-propylacetamide, an N-butylformamide isomer, an N-butylacetamide isomer, an N-butylpropanamide isomer, N,N-diethylpropanamide, N,N-diethylbutanamide, N,N-dimethylpentanamide, and pentanamide.

8. The ink composition of claim 7, wherein the N-butylacetamide isomer is N-n-butylacetamide.

9. The ink composition of claim 7, wherein the N-butylpropanamide isomer is selected from the group consisting of N-isobutylpropanamide, N-n-butylpropanamide, and N-sec-butylpropanamide.

10. The ink composition of claim 1, wherein the penetrant is a lactam compound represented by structure 2) and wherein a+b=4-6.

11. The ink composition of claim 10, wherein a+b=4-5.

12. The ink composition of claim 10, wherein the lactam compound is selected from the group consisting of a substituted 2-pyrrolidone, a substituted 2-valerolactam, and oenthalolactam.

13. The ink composition of claim 12, wherein the substituted 2-pyrrolidone is N-n-butyl-2-pyrrolidone.

14. The ink composition of claim 1, wherein the penetrant is an amide compound represented by structure 3), and wherein a+b+c=6-9.

15. The ink composition of claim 14, wherein a+b+c=6-7.

16. The ink composition of claim 14, wherein a times x=0-4.

17. The ink composition of claim 14, wherein the amide contains a cyclopentyl group.

18. The ink composition of claim 14, wherein the amide contains a cyclohexyl group.

19. The ink composition of claim 18, wherein the amide compound is N-cyclohexylformamide.

20. The ink composition of claim 2, wherein the pigment comprises particles having a median particle size of approximately 0.01 to 0.3 micron.

21. The ink composition of claim 3, wherein said polymeric dispersant comprises a block copolymer and wherein the ink composition comprises approximately 0.1 to 8% pigment, 0.1 to 8% block copolymer, and 94 to 99.8% aqueous carrier medium plus penetrant, based upon the total weight of the ink composition.

22. The ink composition of claim 1, wherein the aqueous carrier medium comprises water and at least one water soluble organic solvent.

23. The ink composition of claim 22, wherein aqueous carrier medium comprises from 30% to 95% water based on the total weight of the aqueous carrier medium plus penetrant.

24. The ink composition of claim 1, wherein said colorant is a dye and wherein said ink composition comprises approximately 0.2 to 20% dye, and 80 to 99.8% aqueous carrier medium plus penetrant, based on the total weight of the ink composition.

25. The ink composition of claim 1, wherein the aqueous carrier medium is a mixture of water and at least one water soluble organic solvent having at least 2 hydroxyl groups.

26. The ink composition of claim 1, wherein said ink composition has a surface tension of approximately 30 to 70 dyne/cm and a viscosity of no greater than 20 cP at 20° C.

27. The ink composition of claim 1, wherein a surfactant is present.

* * * * *